(12) United States Patent
Schulz

(10) Patent No.: US 6,512,960 B1
(45) Date of Patent: Jan. 28, 2003

(54) POSITIONER AND METHOD FOR OPERATING THE POSITIONER

(75) Inventor: Ulrich Schulz, Gruenstadt (DE)

(73) Assignee: Samson Aktiengesellschaft, Frankfurt (DE)

(*) Notice: Subject to any disclaimer, the term of this patent is extended or adjusted under 35 U.S.C. 154(b) by 0 days.

(21) Appl. No.: 09/568,546

(22) Filed: May 11, 2000

(30) Foreign Application Priority Data

May 11, 1999 (DE) .......................................... 199 21 828

(51) Int. Cl.[7] .............................................. G05B 19/18
(52) U.S. Cl. ........................ 700/56; 700/78; 137/487.5; 91/361
(58) Field of Search ...................... 700/56, 78; 714/799; 91/360, 361; 137/487.5

(56) References Cited

U.S. PATENT DOCUMENTS

| 5,549,137 | A | * | 8/1996 | Lenz et al. ................. 137/486 |
| 5,558,115 | A | * | 9/1996 | Lenz et al. .................... 137/86 |
| 5,573,032 | A | * | 11/1996 | Lenz et al. ................. 137/486 |
| 5,931,180 | A | * | 8/1999 | Nagasaka .................... 137/85 |
| 5,934,169 | A | * | 8/1999 | Regel .......................... 91/361 |
| 6,272,401 | B1 | * | 8/2001 | Boger et al. ................ 700/282 |

FOREIGN PATENT DOCUMENTS

| DE | 32 34 237 A1 | 3/1984 |
| DE | 196 22 548 A1 | 12/1997 |
| DE | 92 19 140 U1 | 6/1998 |
| DE | 199 21 828 C2 | 6/2001 |

* cited by examiner

Primary Examiner—Thomas Black
Assistant Examiner—Ronald D Hartman, Jr.
(74) Attorney, Agent, or Firm—Schiff Hardin & Waite

(57) ABSTRACT

The invention relates to a method for operating a positioner with a first input for an input variable W for prescribing a desired value, a second input for a controlled variable X, an output for a manipulated variable Y, and an actuator, which, dependent on the input variable W and the controlled variable X, generates an output signal for forming the manipulated variable Y, whereby the control method comprises detecting, during continuous monitoring, of an abnormal status of the signal representing the controlled variable X generating of an error signal that acts on a changeover unit. When an error signal of the error detection device is present, the method deactivates the actuator with respect to the signal of the positioner that represents the manipulated variable Y, and activates a controller by the changeover unit. Upon such controller activation, the method invokes the generation of a second output signal, which is allocated to the input variable W; the positioner comprises an error detection device which is connected to the second input for the controlled variable X. A changeover unit acts on the error detection device; and a controller, where, given the detection of an error of the signal representing the controlled variable X, the error detection device effectuates a switching of the changeover unit, so that the controller, and not the actuator, determines the manipulated variable Y.

26 Claims, 1 Drawing Sheet

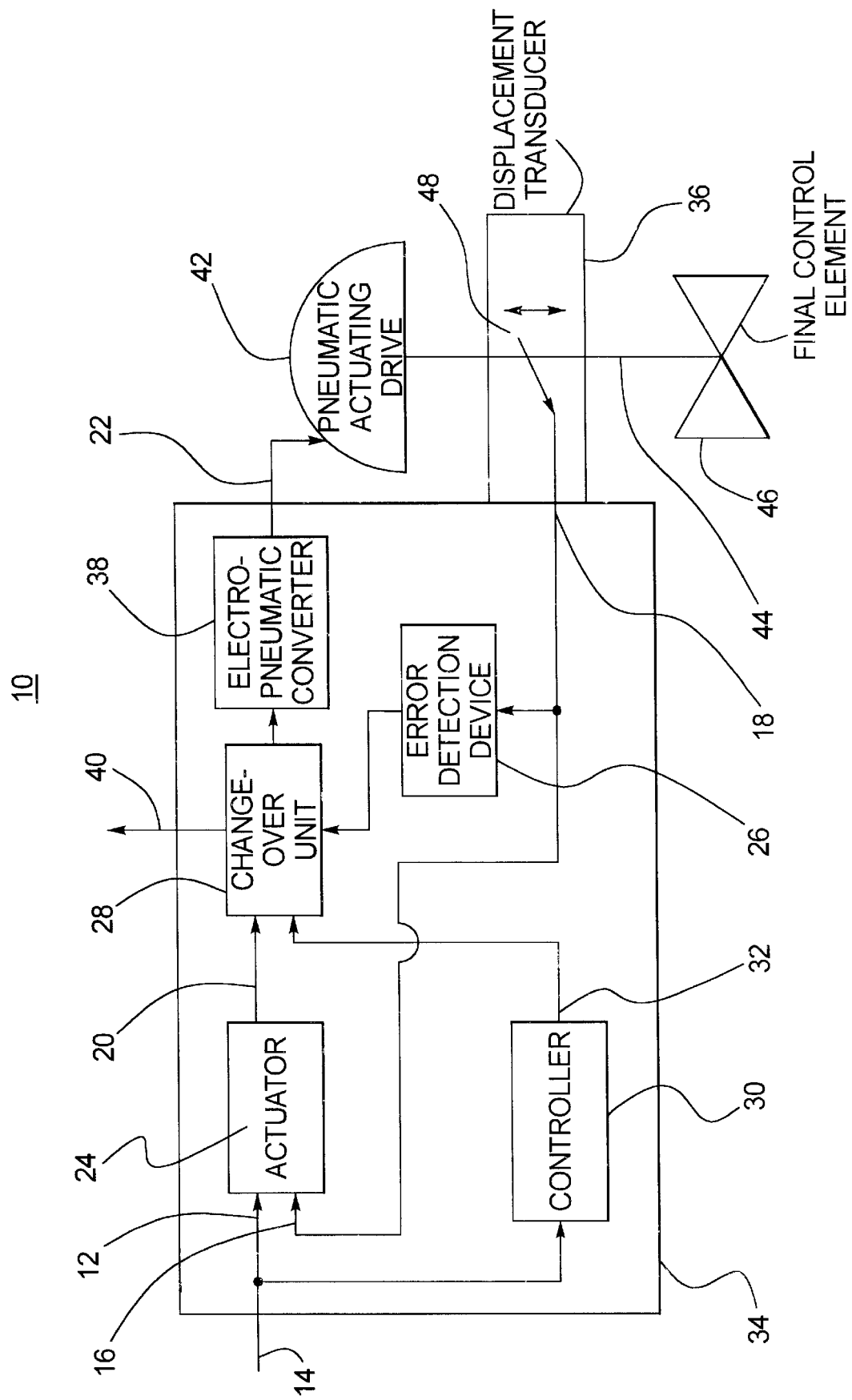

POSITIONER AND METHOD FOR OPERATING THE POSITIONER

BACKGROUND OF THE INVENTION

1. Field of the Invention

The invention relates to operating a positioner with a first input for an input variable W for prescribing a desired value, a second input for a controlled variable X, an output for a manipulated variable Y, and an actuator that generates a first output signal depending on the input variable and the controlled variable. This signal is used for forming the manipulated variable.

2. Description of the Related Art

Positioners are used in a variety of technical processes to control the position of an actuating device in a lower-level control loop. For this purpose, an input variable is generated at the first input of the positioner by an actuator of a higher-level control loop. The position of the actuating device represents the controlled variable X which the positioner is to monitor. The positioner compares this controlled variable X continuously to the input variable W at its first input and adapts, in the sense of matching, a manipulated variable Y that is generated at its output to the desired value prescribed by the input quantity W. The actuating device thus influences a physical quantity which the controlled variable of the higher-level control loop represents and which is usually supposed to be maintained at the desired value.

The building of control loops from several higher-level/superimposed control loops makes possible rapid and stable control processes which permit good control particularly when disturbances are present. These types of control loops are described in the literature under the heading "Cascade Control". The type of technical process itself that is to be controlled is generally not dependent on the positioner used, since the signals for the input variable W, controlled variable X and manipulated variable Y are usually standardized unified signals. However, the characteristics of the process are taken into account by the type of positioner and its parameters. For example, a distinction is made between non-continuous and continuous controllers. Within the continuous controllers, a distinction is made between P-controllers, PI-controllers, PD-controllers, and PID-controllers (Proportional, Integral, Differential).

The behavior of the positioner when errors occur is particularly important to the reliability of the technical process. For instance, a typical error might be the severing of signal lines for the input variable. If this happens, the widely used dual-line positioners lack the energy to operate, and so they do not generate a corrective signal at the output. If the actuating device is an actuating device with a pneumatic drive, a spring memory that is integrated in the drive typically forces the final control element into a safety position when the corrective signal fails to occur.

SUMMARY OF THE INVENTION

It is the object of the invention to further develop the positioner and method for using this positioner to make reliable operation possible and to provide a higher degree of safety of a process even for abnormal states of a signal that represents the controlled variable.

The object relating to the control method is realized by a method for operating a positioner having a first input for an input quantity for prescribing a desired value, a second input for a controlled variable, an output for a manipulated variable signal, and an actuator, comprising the steps of generating, by the actuator, a first output signal based on the input variable and the controlled variable, forming the manipulated variable using the first output signal, continuously monitoring a signal representing the controlled variable by an error detection device, detecting an abnormal status of the controlled variable signal by the error detection device, generating an error signal by the error detection device in response to the detection of an abnormal status, and then providing the error signal to a changeover unit, deactivating the actuator with respect to a signal representing the manipulated variable signal when the error signal is present and preventing a signal representing the controlled variable from influencing the manipulated variable, activating a controller by the changeover unit when the error signal is present, and generating, by the activated controller, a second output signal allocated to the input variable by the controller for forming the manipulated variable.

The object relating to the positioner is realized by a positioner device comprising a first input for an input quantity for prescribing a desired value, a second input for a controlled variable, an output for a manipulated variable, an actuator, which determines the manipulated variable depending on the input variable and the controlled variable, an error detection device, which is connected to the second input for the controlled variable, a changeover unit, upon which the error detection device acts by providing an error signal, and a controller, the error detection device switching the changeover unit when an error of a signal representing the controlled quantity is detected, so that the controller and not the actuator, determine the manipulated variable.

The invention is thus based on the surprising recognition that by monitoring the signal that represents the controlled variable X of the positioner and switching the positioner over from the actuator to a controller in case of an abnormal status of the signal representing the controlled variable X, it is guaranteed that, though control is generally degraded, the operating mode is continuously safe since the higher-level control remains active.

This continuously safe operating mode can be realized by way of an error detection device that processes the signal representing the controlled variable, this device acting on a changeover unit for an abnormal status of this signal such that the changeover unit deactivates the actuator and activates a controller instead. In this process, the actuator is deactivated with respect to the signal of the manipulated variable of the positioner so that neither the signals of the controlled variable X nor modifications of it influence the manipulated variable.

BRIEF DESCRIPTION OF THE DRAWING

Additional features and advantages of the invention derive from the description below, in which an exemplifying embodiment of the invention is illustrated in detail with the aid of a schematic drawing. The drawing, which consists of a single FIGURE, is a block diagram illustrating an inventive electropneumatic positioner.

DESCRIPTION OF THE PREFERRED EMBODIMENTS

The FIGURE shows a positioner 10 for realizing the invention, with arrows visually representing the direction of the transmission of signals between various units. The positioner 10 comprises an actuator 24, which has a first input 12 for an input variable 14 that defines a desired value, and a second input 16 for a controlled variable 18. The input variable 14 is also fed to a controller 30, which, for an abnormal status of the signal representing the controlled variable 18, readies a second output signal 32 representing the desired manipulated variable 22. To achieve this, the actuator 24 and the controller 30 are connected to a changeover unit 28, and in addition, this changeover unit 28 is connected to the actuator 24 via an error detection device 26. The actuator 24, the error detection device 26, the changeover unit 28, and the controller 30 may be arranged in a common housing 34.

In the FIGURE the positioner is represented as an electropneumatic positioner 10 together with a control valve, which consists of pneumatic actuating drive 42, drive spindle 44 and final control element 46. The housing 34 thus also comprises an electropneumatic converter 38, which performs the conversion into a pneumatic corrective signal as the signal of the manipulated variable 22. The pneumatic corrective signal acts on the pneumatic actuating drive 42, which actuates the final control element 46 by way of the drive spindle 44. A displacement transducer 36 is connected to the housing 34 and converts the movement of the drive spindle 44 into a signal for the controlled variable 18 by way of a lever 48 that is coupled to the drive spindle 44 such that it can be rotated.

The error detection device 26 continuously monitors the signal representing the controlled variable 18 and, for an abnormal status of the controlled variable signal, generates an error signal which acts on the changeover unit 28 and switches this over. As a result, the first output signal 20 of the actuator 24 becomes inactive, while the second output signal 32 of the controller 30 represents the manipulated variable 22. The manipulated variable 22 of the positioner 10 is thus determined by the actuator 24 or alternatively is determined by the controller 30, depending on the changeover unit 28.

In a preferred inventive method, the controller 30 generates a second output signal 32 for every input variable 14, regardless of the signal representing the controlled variable 18. If, upon the arrival of an error signal of the error detection device 26, the controller 30 becomes active and the actuator 24 inactive, the controller 30 controls the process with the characteristic that is fixed in it. At least for slowly changing processes and processes with only small disturbances, the signal of the controlled variable 18 can be set, or respectively, maintained, in the vicinity of its desired value in this manner, even when the acquisition of the controlled variable 18 is deactivated in the lower-level control loop consisting of positioner and actuating device. This makes possible a higher degree of operating safety, since an incorrectly acquired controlled variable 18 can bring about manipulated variables 22 of the positioner which have dangerous effects.

In accordance with this principle of operation, the controller 30 cannot compensate for disturbances, though it does make it possible to set (or respectively keep) the signal of the controlled variable 18 of the controlled process in the vicinity of the desired value given a normal process behavior. A shutoff of the process, such as has been previously required for the detection of a failure of the signal of the controlled variable of the control valve, can thus be avoided in many cases. For example, it is possible with this method to postpone a precise investigation of errors that have occurred during times when there are few service personnel available, such as nights or weekends, to a later time. Repair and service in a process-related system can thus be performed more effectively and economically.

It is preferably inventively provided that the error detection device 26 switches the changeover unit 28 when the signal of the controlled variable 18 is outside of a permissible range. The permissible range depends on the minimum and maximum values attainable in normal operation. Furthermore, it can be inventively provided that the error detection device 26 switches the changeover unit 28 when a time-related change of the signal of the controlled variable 18 exceeds a permissible value. An error in the acquired controlled variable 18 can thus be recognized even when the value is still within a permissible range, but the rate of the signal change is greater than the maximum possible rate.

In a particularly simple case, a linear dependency of the output signal 32 on the input variable 14 is provided. The controller 30 preferably reads data from a storage unit (which is not illustrated), and from these data and the value of the input variable 14, it generates the output signal 32.

It is advantageous to the inventive method for the positioner 10 to perform an initialization and compute the relationship between the manipulated variable 22 and the input variable 14 from the initialization. The storage unit can advantageously store the relationship of the manipulated variable 22 and the input variable 14.

It is also advantageous when the positioner 10 determines parameters during operation which define the output signal of the controller 30. The parameters can be stored in the storage unit in digital or analog form.

The controller 30 can also comprise a signal connection to the changeover unit 28 and/or to the error detection device 26, on which a signal is present given a detected error of the acquired controlled variable 18.

It is likewise advantageous when the controller 30 is connected to a clock pulse generator. In a development of the inventive method, the controller 30 generates the second output signal 32 that depends on the time that has passed since the changeover by the changeover unit 28 and on the input variable 14, namely in combination with the signal connection to the changeover unit 28 and/or to the error detection device 26. It is thus possible to control the process for a fixed time following the detection of an error in the acquired variable 18, and then to move a final control element into its safety position, for example, in order to securely rule out the possibility of danger caused by the process. In this case, the controller 30 may transfer the process that is being controlled into an off state.

In an advantageous embodiment, the positioner 10 has an operating unit at its disposal (which is not illustrated), that can be used to perform an initialization of the positioner, with the characteristic curve describing the relationship between the manipulated variable 22 and the input variable 14 being created by the response of the initialization. The characteristic curve is then filed in the storage unit. An improved control is possible when the characteristic curve is updated during the operation of the positioner.

It is also advantageous when the control unit 30 is realized particularly simply and cost-effectively as an analog circuit which continuously generates an output signal from the input variable 14, and the signal is inactive or active depending on the position of the changeover unit 28.

For the purpose of measuring the controlled variable 18, the displacement transducer 36 can be inventively formed from a conductive plastic whose resistance represents the controlled variable 18. Since conductive plastic is not a contactless displacement transducer 26, but rather the movement of the drive spindle 44 is registered by way of a grinder that shifts on the conductive plastic, the displacement transducer is necessarily subject to abrasion. Therefore, the error detection device 26 monitors the acquired controlled variable 18 in order to determine whether the conductive plastic may be damaged. The error detection device 26 can monitor either whether the resistance of the conductive plastic is too large or too small, as could result from breakage or shorting, or whether the resistance changes more rapidly over time than is permitted by the maximum actuation rates.

In any case, a continuation of control using defective signal quantities of the controlled variable 18 could lead to manipulated variable values 22 that are dangerous. For this reason, the error detection device 26 effectuates a switching of the changeover unit 28 in such a way that the controller 30 determines the corrective signal 22, and not the actuator 24.

It can be further provided in accordance with the invention that an error signal 40 is output in case an abnormal signal of the controlled variable 18 is detected by the error detection device 26. This error signal can be outputted either as an electrical signal or as an optical display (e.g., an LED).

It can of course also be inventively provided that several of the units of the positioner, such as the actuator 24, the controller 30, the error detection device 26 and/or the changeover unit 28, are integrated into one unit, which can also be realized in digital form.

The features of the invention that are disclosed in the above specification, in the claims and in the drawing, either individually or in random combination, can be utilized for the realization of the invention in its various embodiments. Although modifications and changes may be suggested by those skilled in the art, it is the intention of the inventor to embody within the patent warranted hereon all changes and modifications as reasonably and properly come within the scope of their contribution to the art.

What is claimed is:

1. A method for operating a positioner having a first input for an input quantity for prescribing a desired value, a second input for a controlled variable, an output for a manipulated variable signal, and an actuator, comprising the steps of:

generating, by said actuator, a first output signal based on said input variable and said controlled variable;

forming said manipulated variable using said first output signal;

continuously monitoring a signal representing said controlled variable by an error detection device;

detecting an abnormal status of said controlled variable signal by said error detection device, generating an error signal by said error detection device in response to said detection of an abnormal status, and then providing said error signal to a changeover unit;

deactivating said actuator when said error signal is present and preventing a signal representing said controlled variable from influencing said manipulated variable;

activating a controller by said changeover unit when said error signal is present; and generating, by said activated controller, a second output signal allocated to said input variable by said controller for forming said manipulated variable.

2. A method as claimed in claim 1, further comprising the step of switching said changeover unit by said error detection device when said controlled variable signal is outside of a permissible range.

3. A method as claimed in claim 1, further comprising the step of switching said changeover unit by said error detection device when a time-related change of said controlled variable signal exceeds a permissible value.

4. A method as claimed in claim 1, wherein said step of generating said second output signal depends on a time that has passed since a switching by the changeover unit or depends on said input variable.

5. A method as claimed in claim 1, further comprising the step of reading data from a storage unit by said controller which uses these data for generating said second output signal and a value of said input variable.

6. A method as claimed in claim 1, further comprising the step of initializing said positioner for the purpose of determining a relation between said manipulated variable and said input variable.

7. A method as claimed in claim 1, further comprising the step of determining parameters, by said positioner during operation, which define said second output signal of said controller.

8. A method as claimed in claim 1, further comprising the step of outputting of an error signal for an abnormal status of said controlled variable signal.

9. A method as claimed in claim 8, wherein said error signal is a signal in a form selected from the group consisting of an electrical signal, and optical signal, and an acoustic signal.

10. A method as claimed in claim 1, further comprising the step of zeroing said second input for the purpose of realizing a control process, resulting in said first output signal deriving solely from said input variable.

11. A positioner device comprising:

a first input for an input quantity for prescribing a desired value;

a second input for a controlled variable;

an output for a manipulated variable;

an actuator, which determines said manipulated variable depending on said input variable and said controlled variable;

an error detection device, which is connected to said second input for said controlled variable;

a changeover unit, upon which said error detection device acts by providing an error signal; and a controller;

said error detection device switching said changeover unit when an error of a signal representing said controlled quantity is detected, so that said controller and not said actuator, determine said manipulated variable.

12. A positioner as claimed in claim 11, wherein said controller has a signal connection to said changeover unit or a connection to said error detection device, said signal connection providing a detected error of said controlled variable signal.

13. A positioner as claimed in claim 11, further comprising a clock pulse generator that is connected to said controller.

14. A positioner as claimed in claim 11, wherein said controller further comprises a storage unit which stores a relationship between said manipulated variable and said input variable.

15. A positioner as claimed in claim 11, further comprising an operating unit which initializes said positioner to obtain a characteristic describing a relationship between said manipulated variable and said input variable from a response of said initialization.

16. A positioner as claimed claim 11, further comprising an analog circuit which generates an output signal from said input variable for forming said manipulated variable.

17. A positioner as claimed in claim 11, further comprising a signal output for outputting an error signal for an abnormal status of said controlled variable signal.

18. A positioner as claimed in claim 11, wherein said positioner is an electropneumatic positioner.

19. A positioner as claimed in claim 11, further comprising a housing that encloses said error detection device, and said controller or an electropneumatic converter.

20. A positioner as claimed in claim 11, wherein said actuator, said error detection device, and said changeover unit are integrated into one unit.

21. A positioner as claimed in claim 20, further comprising a microprocessor that comprises said actuator, said error detection device, said changeover unit, and said controller.

22. A positioner as claimed in claim 11, wherein said actuator, said error detection device, and said changeover unit are realized in digital form.

23. A positioner as claimed in claim 11, further comprising a displacement sensor formed from a conductive plastic for measuring said controlled variable.

24. A positioner as claimed in claim 23, wherein said controller monitors a signal representing a resistance of said conductive plastic.

25. A positioner as claimed in claim 11, wherein said actuator, said error detection device, and said controller are integrated into one unit.

26. A positioner as claimed in claim 11, wherein said actuator, said error detection device, and said controller are realized in digital form.

* * * * *